(12) United States Patent
Mochizuki (10) Patent No.: US 7,371,027 B2
(45) Date of Patent: May 13, 2008

(54) FASTENING TOOL AND FASTENING BOLT (75) Inventor: Kenji Mochizuki, Yao (JP)

(73) Assignee: Isel Co., Ltd., Yao-shi (JP)

( * ) Notice: Subject to any disclaimer, the term of this patent is extended or adjusted under 35 U.S.C. 154(b) by 0 days.

(21) Appl. No.: 10/885,973

(22) Filed: Jul. 8, 2004

(65) Prior Publication Data
US 2005/0079012 A1  Apr. 14, 2005

(30) Foreign Application Priority Data
Oct. 9, 2003 (JP) ............... 2003-350934

(51) Int. Cl.
B25G 3/24 (2006.01)
F16B 2/02 (2006.01)
F16B 7/04 (2006.01)
F16D 1/00 (2006.01)

(52) U.S. Cl. ............ 403/289; 403/290; 403/309; 403/313; 411/537; 24/279

(58) Field of Classification Search .......... 403/13, 403/14, 248, 309, 313, 289, 290, 344; 411/399, 411/309; 24/279
See application file for complete search history.

(56) References Cited

U.S. PATENT DOCUMENTS

| 1,417,149 | A | * | 5/1922 | Dodds | 411/379 |
| 3,868,193 | A | * | 2/1975 | Schott | 403/344 |
| 3,917,424 | A | * | 11/1975 | Zugel | 403/287 |
| 4,116,572 | A | * | 9/1978 | Heldmann et al. | 403/7 |
| 4,619,545 | A | * | 10/1986 | Kuttenbaum | 403/169 |
| 4,848,951 | A | * | 7/1989 | Boogerman et al. | 403/24 |
| 5,590,431 | A | * | 1/1997 | O'Connell | 5/658 |
| 5,997,229 | A | * | 12/1999 | Akers | 411/373 |
| 6,477,923 | B2 | * | 11/2002 | Amis | 81/121.1 |
| 2004/0151538 | A1 | * | 8/2004 | Landwehr | |

FOREIGN PATENT DOCUMENTS

| JP | 11-125265 A | 5/1999 |
| JP | 2001-295851 A | 10/2001 |

* cited by examiner

Primary Examiner—Robert J. Sandy
Assistant Examiner—Nahid Amiri
(74) Attorney, Agent, or Firm—Fitch, Even, Tabin & Flannery (57) ABSTRACT

In a fastening tool in which fastening members may be inclined as they are threadedly inserted together whereby almost no displacement load is applied to the members, a member having a bolt through hole with a tapered seat surface, and a fastening bolt that includes a bolt body provided about its outer periphery with a male thread, and a head provided on an end of the bolt body that has a diameter greater than that of the bolt body, in which the head has a lower outwardly curved tapered surface whose diameter is reduced toward the bolt body so that the lower surface abuts against the tapered seat surface when the fastening tool is used.

7 Claims, 8 Drawing Sheets

FASTENING TOOL AND FASTENING BOLT

BACKGROUND OF THE INVENTION

1. Field of the Invention

The present invention relates to a fastening tool and a fastening bolt for fixing two members without applying a large displacement load to the fastening bolt or a seat surface of the member.

2. Disclosure of the Prior Art

Conventionally, a fastening bolt comprises a rod-like bolt body having a male thread, and a head provided on an end of the bolt body, and the fastening bolt is used in various mechanical elements. A bolt body of the fastening bolt is inserted into a bolt through hole formed in a first member, the bolt body is threadedly engaged with a threaded hole formed in a second member, thereby fixing these two members to each other.

Figure 8:
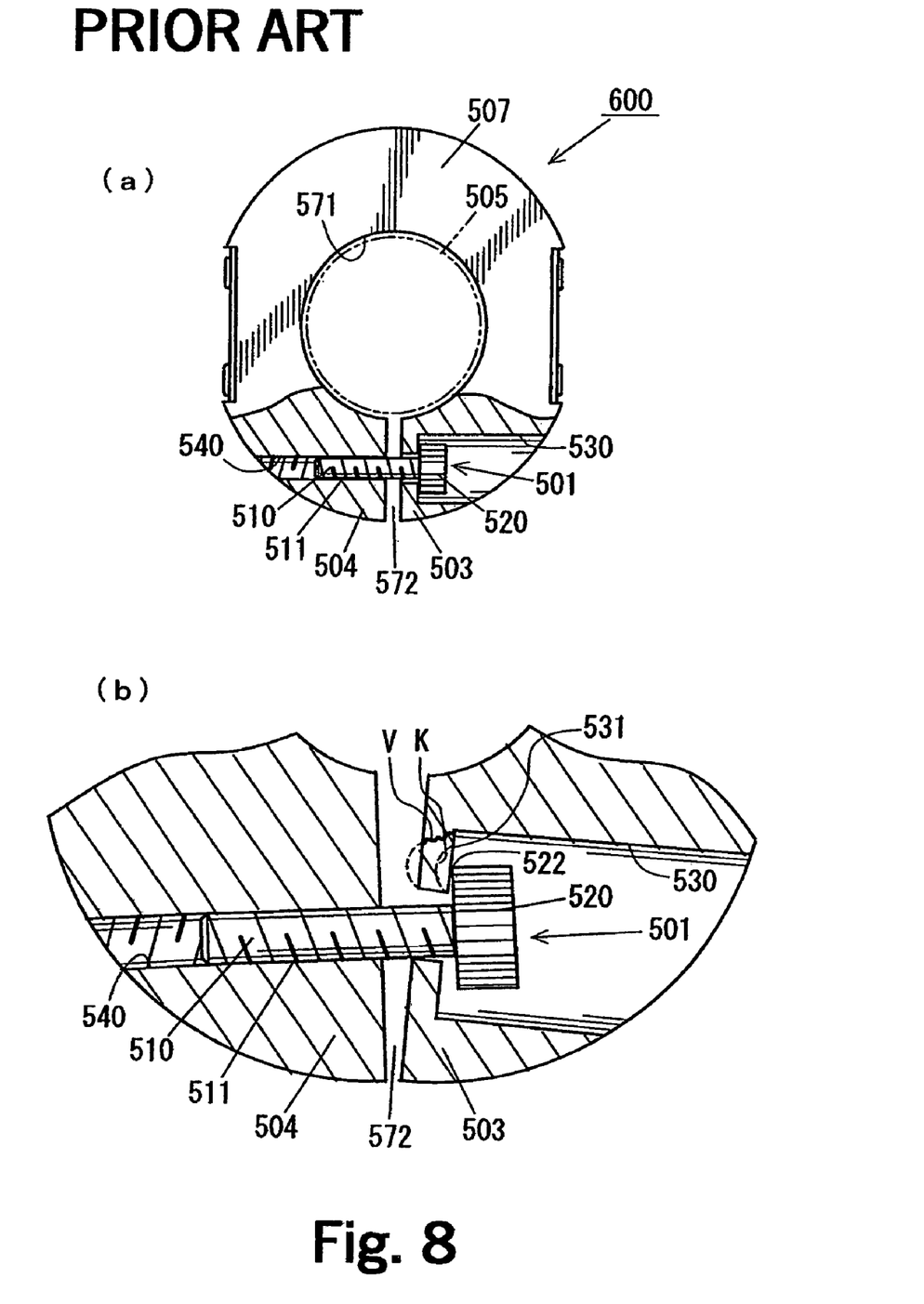
FIG. 8(a) is a partial sectional view showing a shaft coupling using a conventional fastening bolt.
FIG. 8(b) is a partial enlarged sectional view of a shaft coupling using a conventional fastening bolt.

The fastening bolt is used for a shaft coupling as a fastening tool as shown in FIG. 8(a).

In this case, a fastening bolt 501 is used for fastening a fastening body 507 for fixing two shafts 505 in a shaft coupling which connects the two shafts 505 to each other (Japanese Patent Application Laid-open No.2001-295851). The fastening body 507 is provided at its central portion with a shaft hole 571 through which the shaft 505 (other member) is inserted, and is provided with a slot groove 572 in its radial direction. The fastening body 507 is provided at its one end 503 (first member) opposed to the slot groove 572 with a bolt through hole 530, and at its other end 504 (second member) with a threaded hole 540. The fastening bolt 501 is threadedly engaged with the threaded hole 540 through the bolt through hole 530. Therefore, if the fastening bolt 501 is threadedly inserted, a distance of the slot groove 572 is reduced, a diameter of the shaft hole 571 of the fastening body 507 is reduced, and the shafts 505 are fastened and fixed by a surface pressure of the shaft hole 571 caused by the diameter reduction.

When the two members 503 and 504 or the like are to be fixed to each other by means of the fastening bolt 501, the threaded hole 540 provided in the members 504 is not perpendicular to the slot groove 572 but is slightly inclined with respect to the groove in some cases. In such a case, a lower surface corner 522 of the head 520 of the fastening bolt 501 abuts against a seat surface 531 of the member 503 having the bolt through hole 530 in substantially a point-to-point manner, and a large displacement load or bending stress is applied to the seat surface 531 or the fastening bolt 501. Therefore, there is a problem that the fastening force of the fastening bolt 501 is insufficient and the fastened portion is prone to get loose. The head 520 and the bolt body 510 of the fastening bolt 501 are inclined in some cases. In such a case also, there is a problem that the fastening force of the fastening bolt 501 becomes insufficient, and the fastened portion is prone to get loose.

In the case of a shaft coupling 600 shown in FIG. 8(a), as the fastening bolt 501 is threadedly inserted, the opposed ends 503 and 504 of the slot groove 572 of the fastening body 507 are inclined and with this, the seat surface 531 of the one end 503 is also inclined. Therefore, as shown in FIG. 8(b), the lower surface corner 522 of the head 520 of the fastening bolt 501 abuts against the seat surface 531 in substantially a point-to-point manner, and a large displacement load is applied to the fastening bolt 501 and the seat surface 531. Thus, a strong force is required for threadedly inserting the fastening bolt 501, and when the one end 503 which forms the seat surface 531 is thin or when the fastening body 507 is formed of soft material such as aluminum, the seat surface 531 sinks (broken line K in FIG. 8(b)), the fastening of the fastening bolt 501 is weakened, and the fastening force of the shafts 505 becomes insufficient.

Since the lower surface corner 522 of the head of the fastening bolt 501 abuts against the seat surface 531 in substantially a point-to-point manner, large bending stress is applied to the seat surface 531 and the fastening bolt 501. For this reason, if a fastening body 507 vibrates when the shaft coupling rotates, a load caused by the vibration is further applied to the seat surface 531 and the fastening bolt 501 and as a result, a crack V (see FIG. 8(b)) is generated in the seat surface 531 or the fastening of the fastening bolt 501 gets loose.

When two slot grooves are provided at two portions and the fastening body is divided into two pieces and two fastening bolts 501 are used to fasten (FIG. 1 of Japanese Patent Application Laid-open No.2001-295851), it is practically difficult to uniformly fasten the fastening bolts 501, and the same problem is generated.

SUMMARY OF THE INVENTION (1) It is an object of the present invention to provide a fastening tool which prevents a fastening bolt from being loosened and a fastening force with respect to members is strengthened.

First, a first fastening tool comprises a first member having a bolt through hole, a second member having a threaded hole, and a fastening bolt which is inserted into the bolt through hole of the first member and threadedly inserted into the threaded hole of the second member to fasten these members, a seat surface of the bolt through hole in the first member is a conically tapered seat surface formed in a tapered groove, the fastening bolt includes a rod-like bolt body provided at its outer periphery with a male thread, and a head which is provided on an end of the bolt body and which has a diameter greater than that of the bolt body and which abuts against the seat surface of the bolt through hole in the fastening body, and a lower surface of the head is formed into a convex arcuately tapered surface whose diameter is reduced toward a tip end of the bolt body.

A second fastening tool comprises a fastening body which is provided at its central portion with a shaft hole into which a shaft is inserted, which includes a slot groove in its axial direction, and which is provided at its one of opposed ends of the slot groove with a bolt throughhole formed with a seat surface, and at the other end with a threaded hole, and a fastening bolt which is inserted into the bolt through hole of the one end in the fastening body and is threadedly engaged with the threaded hole of the other end to fasten the fastening body in the circumferential direction, the seat surface of the bolt through hole in the fastening body is a tapered seat surface formed in a tapered groove, the fastening bolt includes a rod-like bolt body provided at its outer periphery with a male thread, and a head which is provided on an end of the bolt body and which has a diameter greater than that of the bolt body and which abuts against the seat surface of the bolt through hole in the fastening body, and a lower surface of the head is formed into a tapered surface whose diameter is reduced toward a tip end of the bolt body.

In the fastening tool, the tapered surface in the fastening bolt may be formed into a tapered curved surface which is finished into a curved surface swelling outward. The fastening body may comprise a pair of divided pieces provided by two slot grooves disposed at locations separated away from each other through 180°, and the fastening bolt may comprise a pair of bolts for fastening the pair of divided pieces to each other in the circumferential direction.

With this structure, if the fastening bolt is inserted into the bolt through hole of the one end of the slot groove of the fastening body and is threadedly engaged with the threaded hole on the other end, the tapered surface of the lower surface of the head of the fastening bolt sinks into the tapered seat surface of the bolt through hole of the fastening body. Therefore, as the fastening bolt is fastened, the opposed end surfaces of the slot groove of the fastening body are inclined, and even if the seat surface of the bolt through hole is inclined, the lower surface of the head of the fastening bolt and the seat surface of the bolt through hole abut against each other in the surface to surface manner. Therefore, the displacement load at the time of fastening is received by the tapered seat surface, and the displacement load applied to the seat surface can largely be moderated.

Further, the displacement load applied to the tapered seat surface is largely moderated and as a result, the strength of the one end of the fastening body which forms the tapered seat surface is enhanced and thus, the end can be thinned.

Further, since the tapered surface of the lower surface of the head of the fastening bolt sinks into the tapered seat surface of the bolt through hole, the head of the fastening bolt can deeply sink into the one end of the fastening body.

(2) It is another object of the invention to provide a fastening bolt in which a displacement load between the fastening bolt and the seat surface of the member into which the fastening bolt is to be threadedly inserted is moderated.

This fastening bolt comprises a rod-like bolt body provided at its outer periphery with a male thread, and a head provided on an end of the bolt body and having a diameter greater than that of the bolt body, a lower surface of head is formed into a tapered surface whose diameter is reduced toward a tip end of the bolt body, and the tapered surface is formed into a tapered curved surface finished into a curved surface swelling outward.

With this structure, when the first member and the second member are to be fixed to each other, even if the threaded hole of the second member is inclined or the fastening bolt itself is bent, the tapered curved surface of the head lower surface appropriately slides on the tapered seat surface of the bolt through hole and the attitude of the bolt body substantially matches with the axial direction of the threaded hole of the second member. Therefore, the threadedly insertion of the bolt body substantially matches with the axial direction of the threaded hole of the second member, and the fastening bolt can easily enter concentrically with the threaded hole.

Further, since the tapered curved surface and the tapered seat surface of the first member come into smooth contact with each other at the time of threadedly insertion, the resistance at the time of threadedly insertion is small and it is easy to threadedly insert. Further, the shaft force (threadedly fastening force) is also stabilized. Since the tapered curved surface of the head lower surface of this fastening bolt abuts against the tapered seat surface and threadedly inserted thereto, even if the fastening bolt is threadedly inserted into the inclined threaded hole, the lower surface corner is not caught in the seat surface and this does not make it difficult to threadedly insert unlike the conventional head having a flat surface.

If the threadedly insertion of the fastening bolt is completed, the tapered curved surface of the head lower surface and the tapered seat surface of the first member are fitted to each other in the taper manner. Therefore, the loosening preventing effect by the taper fitting is exhibited after the fastening. Further, even if the fastening bolt is threadedly inserted into the inclined threaded hole, since the contact position of the tapered curved surface in the tapered seat surface is the same height over substantially the entire periphery, the taper fitting force is applied uniformly to substantially the same height position of the head. Thus, the loosening preventing effect is reliably exhibited, and strong fastening force with respect to the two members can reliably exhibited.

EFFECT OF THE INVENTION

According to the fastening tool of the present invention, since the displacement load at the time of fastening of the bolt applied to the seat surface of the bolt through hole in the fastening body is largely moderated, the strength of the one end having the bolt through hole of the fastening bolt is enhanced, and the end surface of the slot groove is prevented from swelling and as a result, the fastening force can sufficiently be secured.

According to the fastening bolt of the present invention, even if the threaded hole of the member into which the fastening bolt is to be threadedly inserted is inclined or the fastening bolt itself is bent, a large displacement load is not applied to the seat surface and the fastening bolt, and the first member and the second member can easily be fixed to each other. The loosening preventing effect is reliably exhibited, and the strong fastening force can reliably be exhibited between the two members.

Other object, features, aspects and advantages of the invention will become more apparent from the following detailed description of embodiments with reference to the accompanying drawings and appended claims.

DETAILED DESCRIPTION OF THE INVENTION EMBODIMENTS

Embodiments of the present invention will be explained with reference to the accompanying drawings below.

Embodiment 1

A fastening tool of an embodiment 1 of the present invention will be explained.

As shown in FIG. 1(a), this fastening tool includes a first member 3 having a bolt through hole 30 and a tapered seat surface 31, a second member 4 having a threaded hole 40, and a fastening bolt 1 for fastening the members 3 and 4.

The fastening bolt 1 includes a rod-like bolt body 10 provided at its outer periphery with a male thread 11, and a cylindrical head 20 which is provided on an end of the bolt body 10 and which has a diameter larger than that of the bolt body 10. An upper surface of the head 20 of the fastening bolt 1 has a hexagonal hole (see FIG. 2) into which a hexagonal wrench is to be fitted. A side surface of the head 20 is knurled. A lower surface of the head 20 is tapered toward a tip end of the bolt body 10 such that its diameter is reduced toward the tip end of the bolt body 10, and is a tapered curved surface 21 in which the tapered surface outwardly swells in a form of a crowning. The tapered curved surface 21 abuts against a tapered seat surface 31 having a tapered groove formed in the bolt through hole 30.

As shown in FIG. 1(a), a taper angle θ1 of the tapered curved surface 21 may be set greater than a taper angle θ2 of the tapered seat surface 31 which is a seat surface, or may be set substantially equal to the taper angle θ2. The curvature of the tapered curved surface 21 may be set freely. For example, in order to enhance the sliding properties of the tapered curved surface 21 on the tapered seat surface 31, the curvature is set to about 5R to 1200R although it varies depending upon a size of the head 20, a length of a tapered portion of the tapered curved surface 21 and its taper angle.

The fastening bolt 1 may be formed by a press or a turning machine such that a lower half of the head 20 of the existing bolt having a hexagonal hole (e.g., M6 size <head diameter φ10 mm>) is the tapered curved surface 21. With this structure, a sideway swelling amount of the head 20 is reduced as compared with a countersunk screw having the same size, and the head 20 can be reduced in size.

The fastening bolt 1 is a bolt having a hexagonal hole and having the cylindrical head 20, but the head 20 may be hexagonal columnar shape and the fastening bolt 1 is a hexagonal bolt.

According to the fastening bolt 1 of the embodiment 1, as shown in FIG. 1(a), when the first member 3 having the bolt through hole 30 and the tapered seat surface 31, and the second member 4 having the threaded hole 40 are superposed on and fastened to each other, even if the threaded hole 40 of the second member 4 is not perpendicular to the upper surface and is inclined at an angle θ, the attitude of the fastening bolt 1 (threading inserting direction of the bolt body 10) can substantially match with an axial direction of the threaded hole 40 of the second member 4. That is, when the fastening bolt 1 is threadedly inserted, the lower surface of the head 20 abuts against the tapered seat surface 31 of the first member 3, and the tapered curved surface 21 appropriately slides on the tapered seat surface 31.

With this, the fastening bolt 1 can enter concentrically with the threaded hole 40 easily. Therefore, even if the threaded hole 40 of the second member 4 into which the fastening bolt 1 is threadedly inserted is inclined, the first member 3 and the second member 4 can be fixed to each other without loose without applying a large displacement load to the fastening bolt 1 and the tapered seat surface 31.

As shown in FIG. 1(b), in this fastening tool, the first member 3 and the second member 4 may be fastened to each other with the other member 5 interposed therebetween. In this case, even if the first member 3 and the second member 4 are inclined as the fastening bolt 1 is threadedly inserted, like the above case (FIG. 1(a)), the tapered curved surface 21 appropriately slides on the tapered seat surface 31, and the attitude of the fastening bolt 1 can substantially match with the axial direction of the threaded hole 40 of the second member 4. Therefore, when the first member 3 and the second member 4 are fastened to each other with the other member 5 interposed therebetween, the fastening bolt 1 can enter concentrically with the threaded hole 40 easily, a large displacement load is not applied to the fastening bolt 1 and the tapered seat surface 31, and the first member 3 and the second member 4 can be fixed to each other without loose with the member 5 interposed therebetween.

Since the tapered curved surface 21 of the head 20 and the tapered seat surface 31 of the first member 3 of the fastening bolt 1 abut against each other in substantially a point-to-point manner, a friction resistance at the time of threadedly insertion, and it is easy to threadedly insert. That is, a threadedly inserting torque of the fastening bolt is small.

In the case of the conventional fastening bolt 501 (FIGS. 8(a) and (b)), if the threadedly insertion is completed, only the lower surface of the bolt head 520 abuts against the seat surface 531. In this fastening bolt 1, if threadedly insertion of the fastening bolt 1 is completed, since the tapered curved surface 21 of the fastening bolt 1 and the tapered seat surface 31 of the first member 3 are fitted to each other in a tapered form, a loosening preventing effect is exhibited by the taper fitting after the fastening.

Further, even if the fastening bolt 1 is threadedly inserted into the inclined threaded hole 40, the contact position of the tapered curved surface 21 in the tapered seat surface 31 is at the same height over substantially the entire periphery (a symbol h in FIG. 1(a) and a symbol h in FIG. 1(b)), the taper fitting force is applied uniformly to substantially the same height position h of the head 20. Thus, the loosening preventing effect is reliably exhibited, and strong fastening force with respect to the members 3 and 4 can reliably be exhibited.

When the taper angle θ1 of the tapered curved surface 21 in the fastening bolt 1 is greater than the taper angle θ2 of the tapered seat surface 31, the contact position h of the tapered curved surface 21 in the tapered seat surface 31 becomes high and comes closer to an upper surface of the head 20 (the contact position h in FIG. 1(a) is higher than the contact position h in FIG. 1(b). With this, since the head 20 of the fastening bolt 1 is fitted in the taper manner at the thick portion of the tapered seat surface 31, the taper fitting force with respect to the tapered seat surface 31 can be increased by the fastening bolt 1. Thus, the loosening preventing effect is remarkably exhibited, and a strong fastening force is reliably exhibited between the members 3 and 4. With this, even if the material of the first member 3 is weak such as aluminum die-cast, since the strength of the seat surface 31 is increased, the first member 3 becomes less prone to be broken.

On the other hand, as the tapered seat surface 31 of the first member 3 of the fastening bolt 1 becomes more acute angle (an angle between the taper angle θ2 and the axial direction of the bolt through hole 30 is small, e.g., 90° or less), the direction of the taper fitting force between the tapered curved surface 21 of the fastening bolt 1 and the tapered seat surface 31 comes close to 90° with respect to the axial direction of the fastening bolt 1, the loosening preventing effect and strong fastening can further be exhibited.

Figure 1:
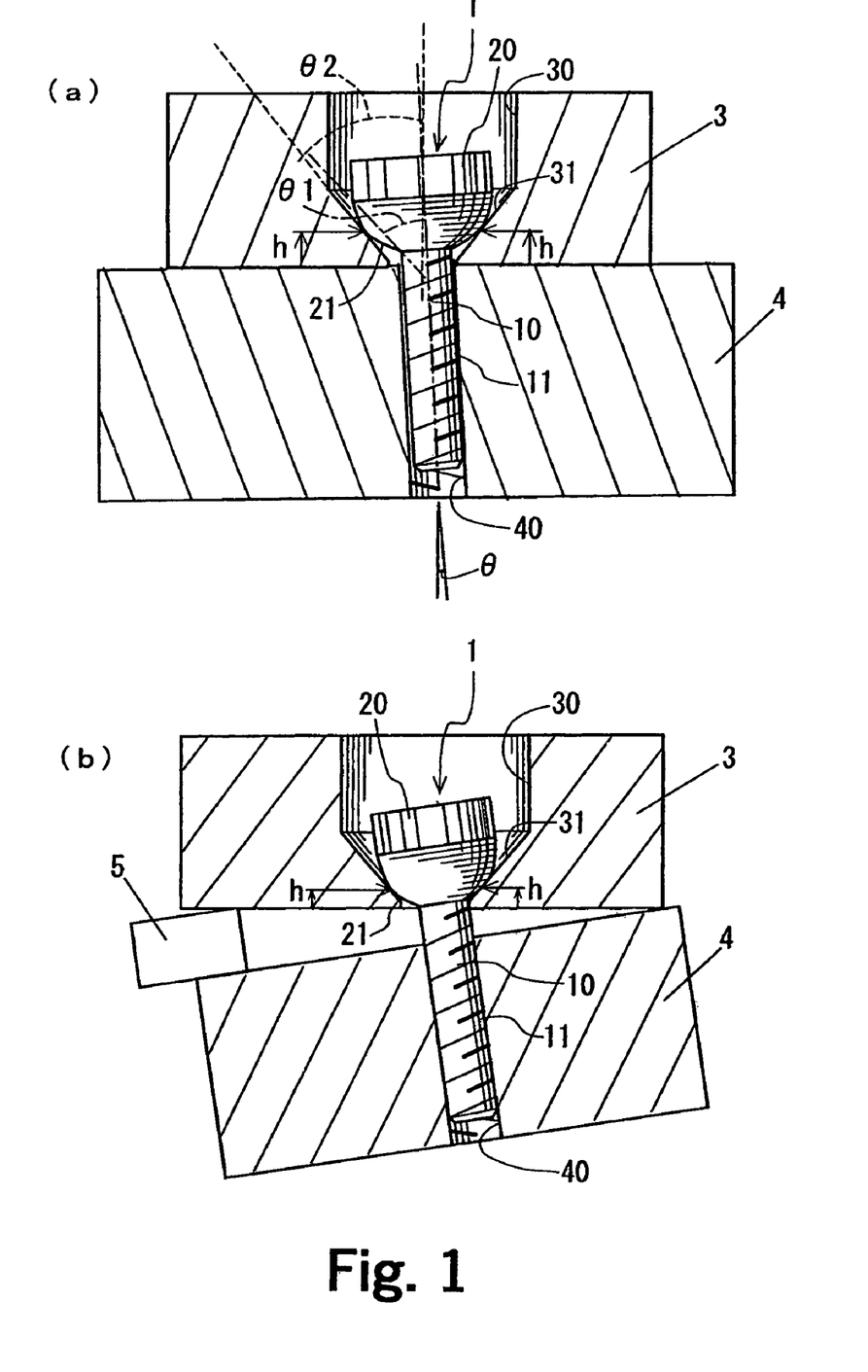
FIG. 1(a) is a side view showing a fastening bolt which fastens two members 3 and 4 in an embodiment 1.
FIG. 1(b) is a side view of the fastening bolt of the embodiment 1 which fastens the two members 3 and 4 with another member 5 interposed therebetween.

Although the threaded hole 40 of the second member 4 is inclined in the example shown in FIG. 1, even if the threaded hole 40 is not inclined and is perpendicular but the head 20 of the fastening bolt 1 itself and the bolt body 10 are bent, the tapered curved surface 21 of the bent fastening bolt 1 likewise appropriately slides on the tapered seat surface 31, the threadedly insertion of the bolt body 10 can match with the axial direction of the threaded hole 40 of the second member 4. Thus, even if the fastening bolt 1 is bent in this manner, the fastening bolt 1 can enter concentrically with the threaded hole 40, a large displacement load is not applied to the tapered seat surface 31 and the fastening bolt 1, and the first member 3 and the second member 4 can be fixed to each other easily.

Embodiment 2

A shaft coupling of an embodiment 2 as a fastening tool of the invention will be explained.

Figure 2:
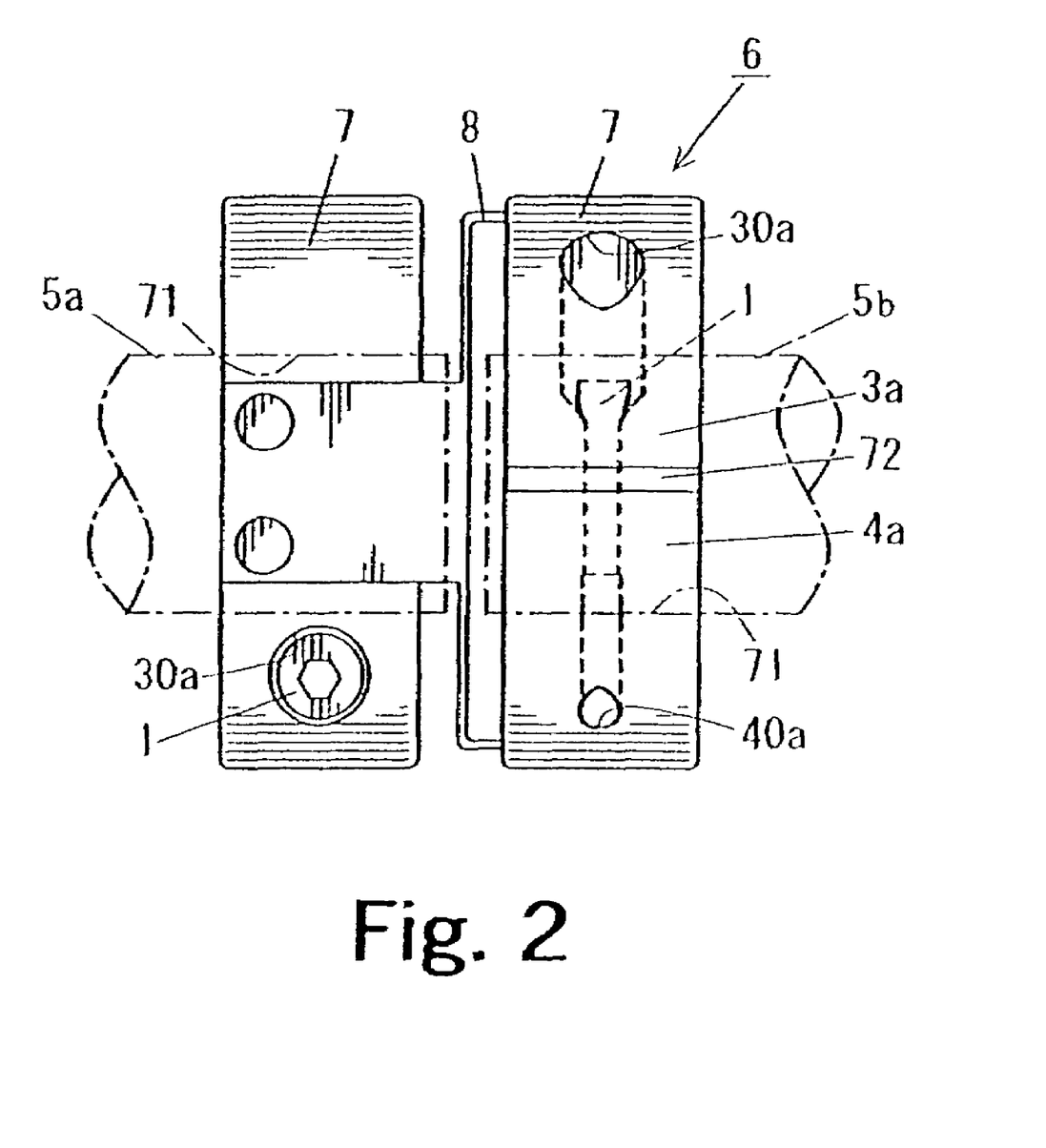
FIG. 2 is a side view showing a structure of a shaft coupling of an embodiment 2.

As shown in FIG. 2, in the shaft coupling 6, two C-shaped fastening bodies 7 provided with a slot groove 72 extending to a center shaft hole 71 are connected to each other by means of a leaf spring intermediate body 8. A shaft 5a which is a driving shaft is disposed in one of the fastening bodies 7, and another shaft 5b which is a follower shaft is disposed in the other fastening body 7. With this structure, the two shafts 5a and 5b are connected to each other through the shaft coupling 6.

Figure 3:
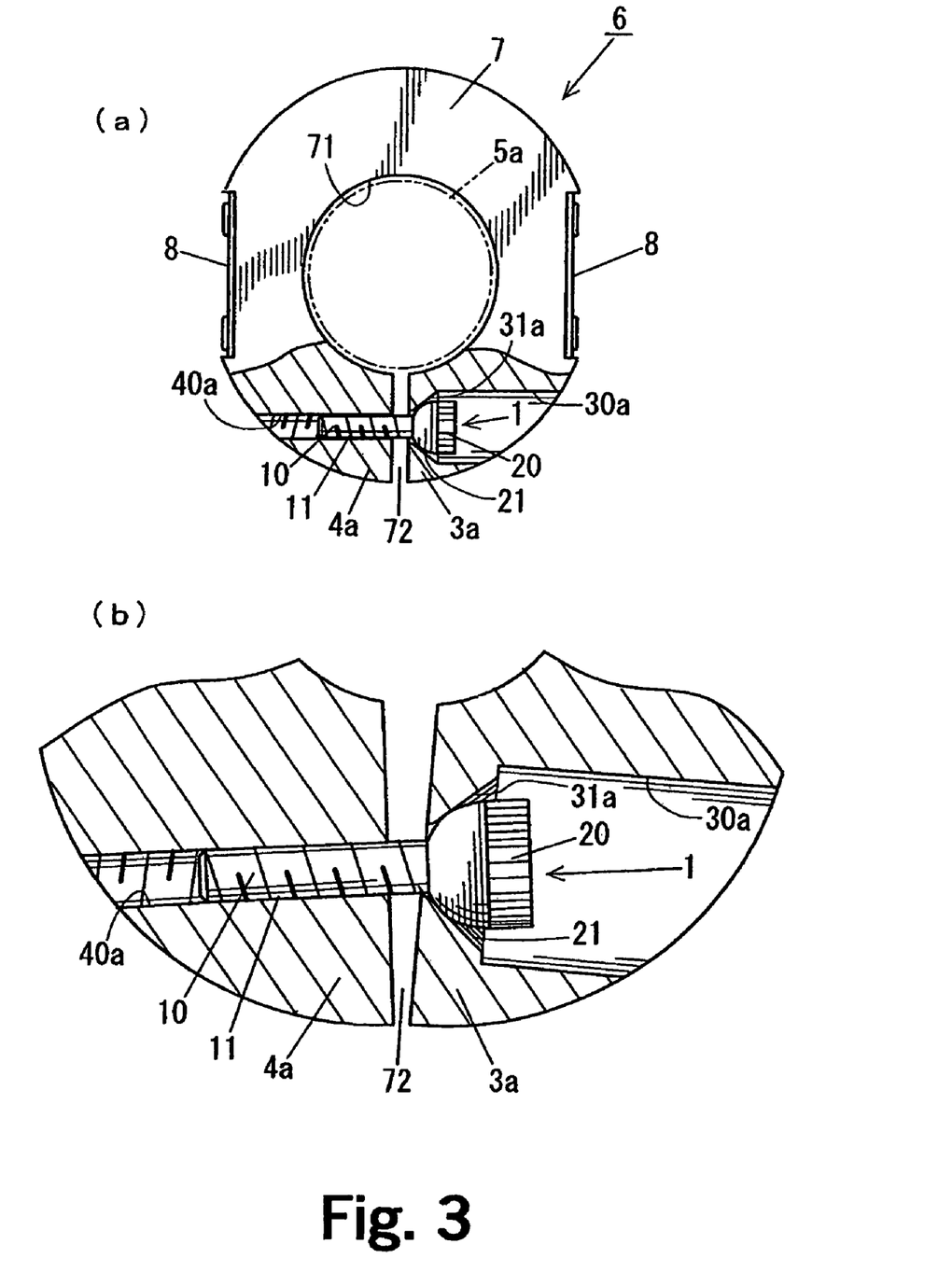
FIG. 3(a) is a partial sectional view showing a fastening bolt of the shaft coupling in the embodiment 2.
FIG. 3(b) is an enlarged sectional view of the fastening bolt of the shaft coupling in the embodiment 2.

As shown in FIG. 3(a), in the fastening body 7, the one of the opposed ends 3a (first member 3) of the slot groove 72 is provided with the bolt through hole 30, and the other end 4a (second member 4) is provided with the threaded hole 40a into which the fastening bolt 1 is to be threadedly inserted. The bolt through hole 30a is provided with a tapered seat surface 31a whose diameter is increased toward the inlet. The tapered seat surface 31a abuts against the entire periphery of the tapered curved surface 21 of the fastening bolt 1. The fastening bolt 1 is inserted through the bolt through hole 30a of the one end 3a of the fastening body 7 and is threadedly engaged in the threaded hole 40a of the other end 4a.

When the shaft 5a is to be fastened to the shaft coupling 6, the shaft 5a is inserted into the shaft hole 71 of the fastening body 7 and then, the fastening bolt 1 mounted on the fastening body 7 is threadedly inserted. Then, the lower surface of the head 20 which becomes the tapered curved surface 21 in the fastening bolt 1 pushes the tapered seat surface 31a formed in the bolt through hole 30a, reduces the gap of the slot groove 72 to reduce the diameter of the shaft hole 71, and the shaft 5a is strongly fastened by the surface pressure caused by this diameter reduction.

At that time, as shown in FIG. 3(b), the opposed ends 3a and 4a of the slot groove 72 are inclined, but the tapered curved surface 21 of the fastening bolt 1 appropriately slides on the tapered seat surface 31a of the one end 3a and thus, the attitude of the fastening bolt 1 matches with the axial direction of the threaded hole 40a, and the fastening bolt 1 can enters concentrically with the threaded hole 40a. Therefore, no displacement load is applied to the fastening bolt 1 and the tapered seat surface 31a, and the fastening bolt 1 can be threadedly inserted smoothly without strong force (large fastening torque).

Even after the fastening operation is completed, no displacement load is applied to the fastening bolt 1 and the tapered seat surface 31a, and the tapered curved surface 21 of the fastening bolt 1 pushes the entire periphery of the tapered seat surface 31a (taper fitting state). With this, unlike the conventional art shown in FIG. 8(b), the seat surface does not sink and the fastening of the fastening bolt is not weakened, and the strong fixing can be made without deteriorating the fastening force of the shaft, and the fastening bolt 1 is not loosened by vibration caused by rotation of the shaft coupling 6. Further, since stress is not applied to the tapered seat surface 31a and the fastening bolt 1, even if a further load is applied by vibration caused by rotation of the shaft coupling 6, damage such as a crack V (see FIG. 8(b)) of the tapered seat surface 31a and the bent of the fastening bolt 1 can be prevented. Thus, the strong fastened state of the shaft 5a by the fastening body 7 can be maintained stably for a long term.

Embodiment 3

Another shaft coupling as a fastening tool of an embodiment 3 of the present invention will be explained.

Figure 4:
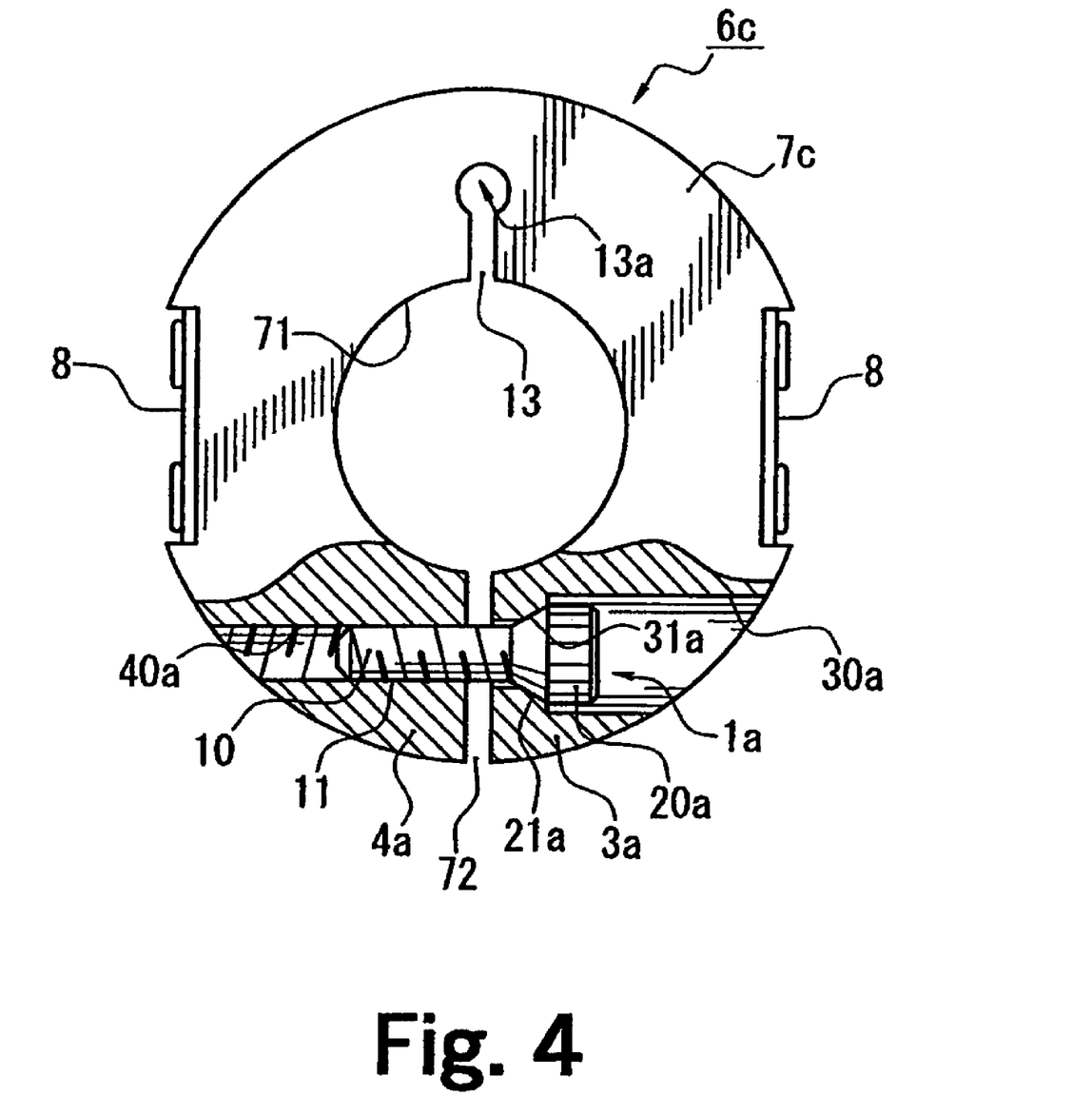
FIG. 4 is a partial sectional view showing a structure of a shaft coupling of an embodiment 3.

As shown in FIG. 4, a fastening bolt 1a used in a shaft coupling 6c, a lower surface of the head 20a is formed as a tapered curved surface 21a and is substantially aligned with a bolt through hole 30a of the fastening body 7 and is sunk. That is, the lower surface of the head 20a of the fastening bolt 1a is formed as the tapered curved surface 21a whose diameter is reduced toward a tip end of the bolt body 10, but the lower surface is not formed with the tapered curved surface 21 unlike the embodiment 1. The fastening body 7c of the shaft coupling 6c is provided with an auxiliary groove 13 in the axial direction at location opposed to the slot groove 72 of the shaft hole 71. The auxiliary groove 13 allows the diameter of the fastening body 7c to be reduced smoothly. Other structure is the same as that of the embodiment 2, the same symbols as those in FIGS. 2 and 3(a) and 3(b) are used in FIG. 4, and explanation thereof is omitted.

When the shaft 5a is to be fastened to the shaft coupling 6c, as in the embodiment 2, the shaft 5a is inserted into the shaft hole 71 of the fastening body 7c and then, the fastening bolt 1a is threadedly inserted in the circumferential direction of the fastening bolt 7c. Then, the lower surface of the head 20a of the fastening bolt 1a pushes the seat surface 31a of the bolt through hole 30a of the fastening body 7c to reduce the gap of the slot groove 72, and the diameter of the shaft hole 71 of the fastening body 7c is reduced. At that time, the gap of the auxiliary groove 13 opposed to the slot groove 72 is also reduced, and the diameter of the shaft hole 71 is smoothly reduced. A closed end 13a of the auxiliary groove 13 serves as a fulcrum and the diameter of the shaft hole 71 is reduced and thus, the inclination angle of the opposed ends 3a and 4a of the slot groove 72 can be reduced. By this diameter reduction, the shaft 5a is strongly fixed to the shaft hole 71 of the fastening body 7c.

As the fastening bolt 1a is fastened, the opposed ends 3a and 4a of the slot groove 72 of the fastening body 7c are inclined, and the tapered seat surface 31a of the bolt through hole 30a is also inclined, but since the lower surface of the head 20a of the fastening bolt 1a which became the tapered curved surface 21 sinks into the tapered seat surface 31a of the inlet of the bolt through hole 30a, the tapered surfaces thereof abut against each other in the tapered seat surface 31a, the displacement load at the time of fastening of the bolt is received, and the displacement load applied to the tapered seat surface 31a of the bolt through hole 30a is largely moderated.

This means that the tapered surface 21 of the lower surface of the head 20a abuts against the tapered seat surface 31a in the tapered surface-tapered surface manner, the displacement load when the bolt is fastened is received and thus, the strength of the end 3a of the fastening body 7c forming the tapered seat surface 31a is enhanced.

Therefore, the end surface of the slot groove 72 in the one end 3a of the fastening body 7c (broken line L in FIG. 8(b)) is prevented from swelling, the fastening of the shaft 5a is not hindered by the swelling of the end surface of the slot groove 72 unlike the conventional art, and the fastening force to the shaft 5a can sufficiently be secured.

Since the tapered curved surface 21a of the lower surface of the head 20a of the fastening bolt 1a sinks into the tapered seat surface 31a of the inlet of the bolt through hole 30a, the fastening bolt 1a can deeply sink into the one end 3a of the fastening body 7c. Thus, after the fastening bolt 1a is fastened, the head 20a of the fastening bolt 1a can be prevented from projecting from the outer peripheral surface of the fastening body 7c.

Further, the displacement load against the tapered seat surface 31a of the bolt through hole 30a is largely moderated. As a result, the strength of the one end 3a of the fastening body 7c forming the tapered seat surface 30a is enhanced and thus, the thickness of the one end 3a (thickness between the tapered seat surface 31a and the end surface of the slot groove 72) can be made relatively thin. With this, it is possible to further reliably prevent the head 20a of the fastening bolt 1a from projecting from the outer peripheral surface of the fastening body 7c.

Figure 5:
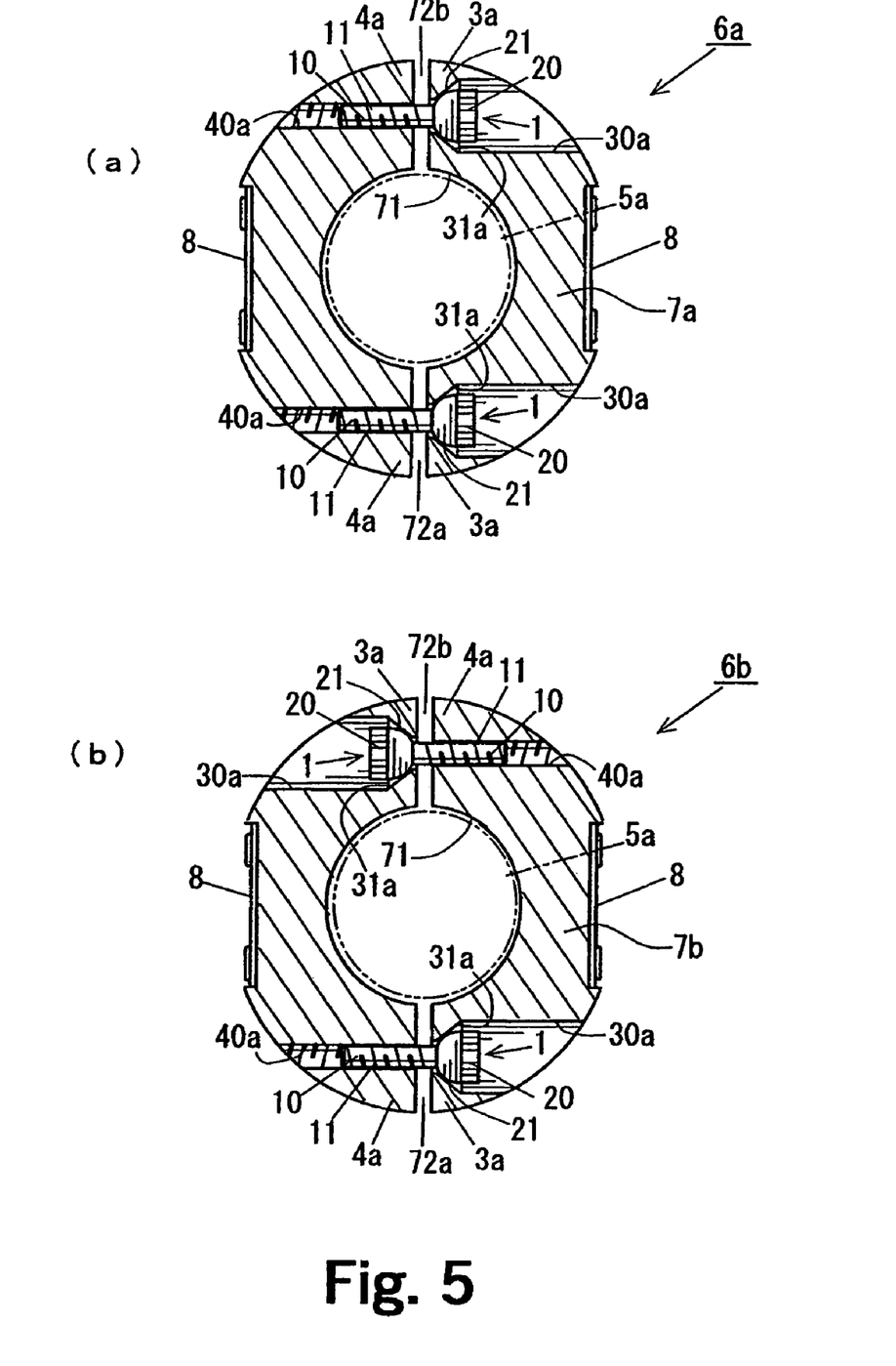
FIG. 5(a) is a sectional view showing another example of the shaft coupling of the embodiments 2 and 3.
FIG. 5(b) is a sectional view showing further another example of the shaft coupling of the embodiments 2 and 3.

Other Embodiments (1) In the shaft coupling as the fastening tool of the present invention, like a shaft coupling 6a shown in FIG. 5(a), a fastening body 7a may be provided with two slot grooves 72a and 72b at locations separated away from each other through 1800, and may comprises divided two semi-circular pieces. In this case, one of the divided pieces of the fastening body 7a has one end 3a (first member 3) or the other end 4a (second member 4).

Further, like a shaft coupling 6b shown in FIG. 5(b), a fastening body 7b may be provided with two slot grooves 72a and 72b at locations separated away from each other through 180°, and may comprises divided two semi-circular pieces. In this case, one of the divided pieces of the fastening body 7a has one end 3a (first member 3) or the other end 4a (second member 4). This is more advantageous for production because the pair of divided pieces which become the fastening body 7b have the same structure.

Figure 6:
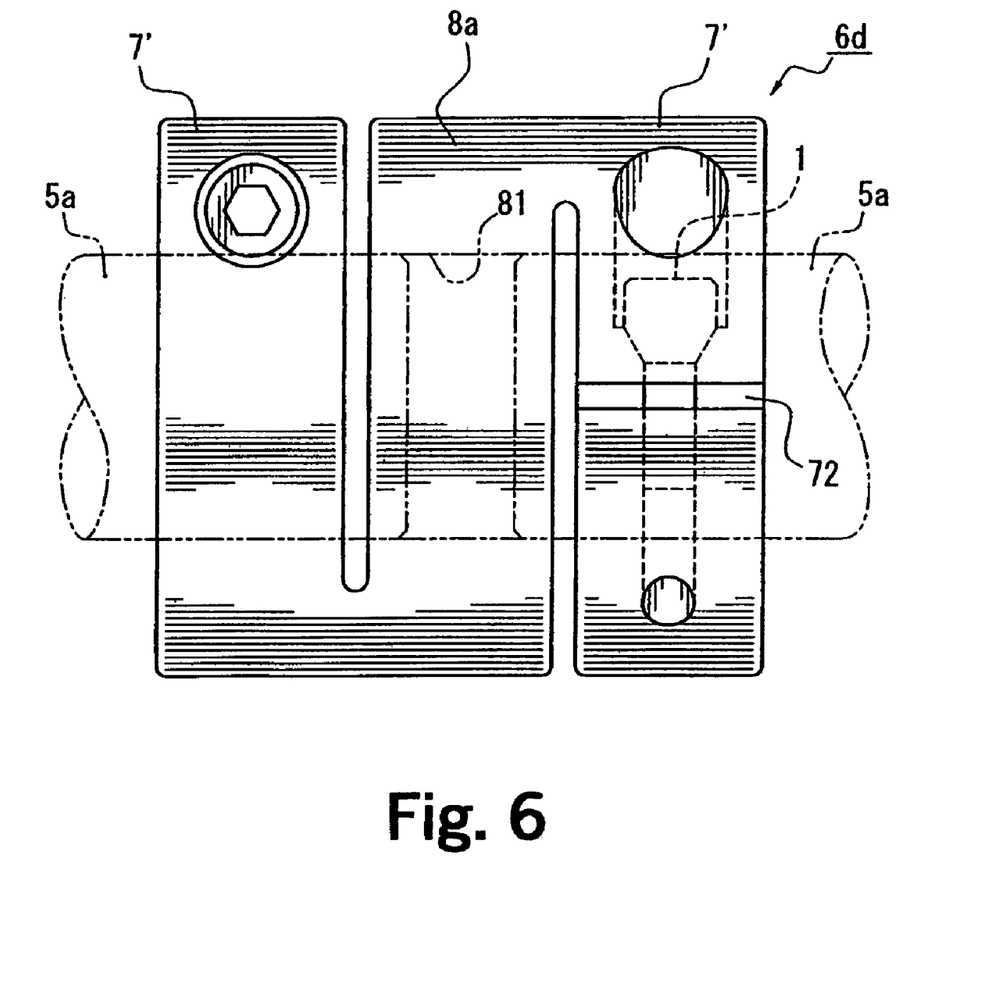
FIG. 6 is a side view showing another example of the shaft coupling of the embodiments 2 and 3.

(2) As the shaft coupling of the present invention, the intermediate body for connecting the two fastening bodies to each other is not limited to the leaf spring intermediate body 8 shown in FIG. 2, and the intermediate body may integrally formed with two fastening bodies 7' and 7' by a block intermediate body 8a provided with a center hole 81.

Figure 7:
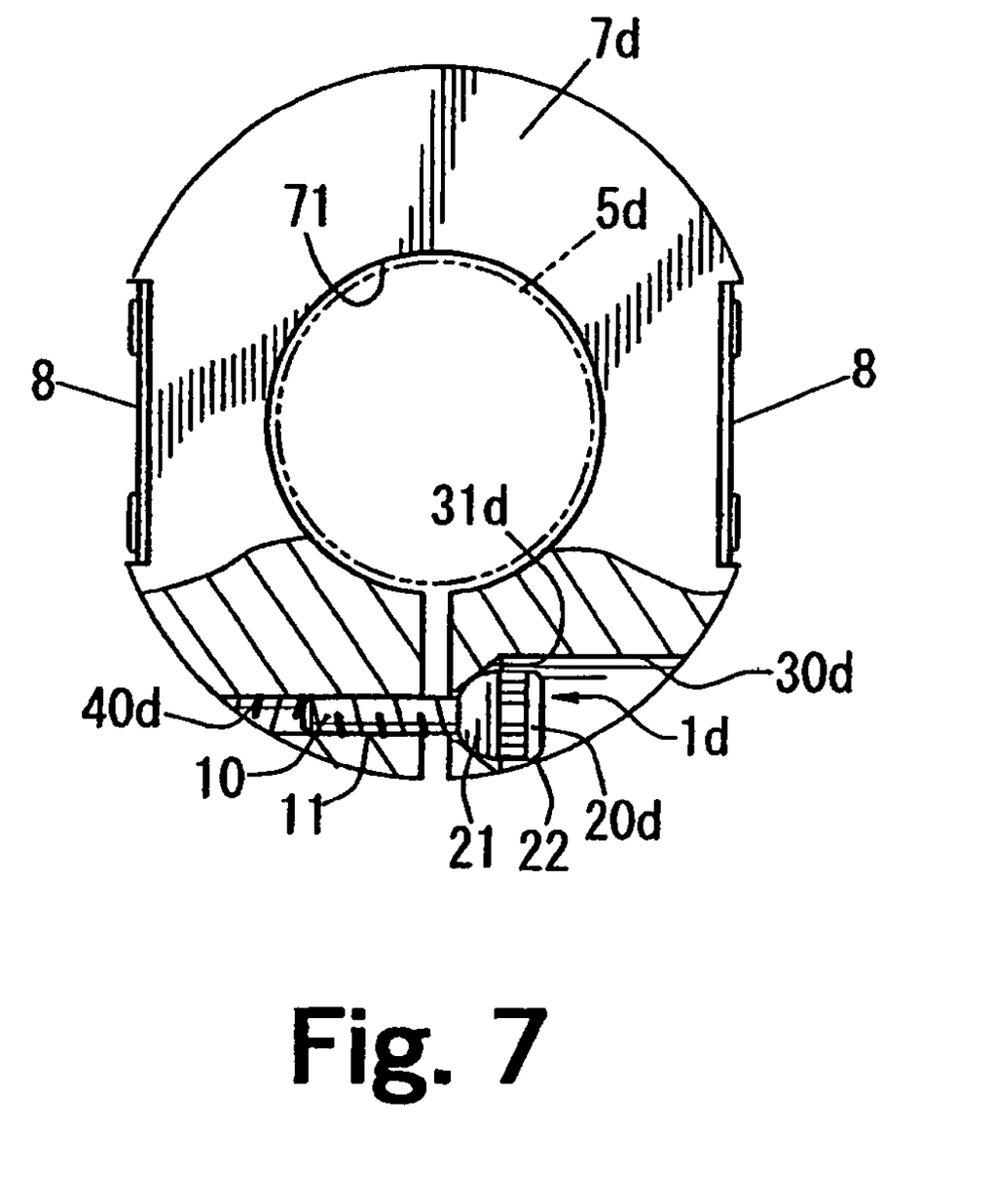
FIG. 7 is a sectional view showing a fastening bolt of a shaft coupling using a fastening bolt according to another embodiment.

(3) As the fastening bolt of the present invention, a corner 22 of the upper surface of the head 20d may be rounded like a fastening bolt 1d shown in FIG. 7, or the corner may be chamfered. By rounding the corner 22 of the upper surface of the head 20d of the fastening bolt 1d in this manner, since the head 20d of the fastening bolt 1d sinks into the tapered seat surface 31d of the bolt through hole 30d, it is possible to restrain the head 20d from projecting from the outer peripheral surface of the fastening body 7d. As a result, since the bolt through hole 30d in the fastening body 7d can be disposed at outer side, the pressure cone apex of fastening of the shaft 5d can be separated away from the shaft core of the shaft 5d, and the transmission torque by the fastening body 7d toward the shaft 5d is further enhanced advantageously.

(4) The fastening tool of the present invention is not limited to the shaft coupling, and can be applied to a pipe joint for connecting two pipes to each other, or a collar for mounting a sensor to another member such as a pole, frame, shaft and the like, and can be applied to various fastening tools comprising the first member 3 and the second member 4 which are integrally or separately formed.

EXAMPLE

The lower surface of the head of the bolt of the embodiment 1 to 3 used the fastening bolt (fastening bolt 1 in FIG. 1(a)) formed on the tapered curved surface, and the lower surface of the head of embodiments 4 to 6 used the fastening bolt (fastening bolt 1a in FIG. 4) formed on merely a tapered surface, and the transmission torque when the fastening bodies sandwiching the shaft by the fastening bolt were fastened was measured. The fastening bolt is fastened with a predetermined fastening torque and then, the shaft is fixed so that the shaft does not rotate, and a load is applied to the fastening body in the rotation direction. In this state, a torque value when the fastening body starts rotating is the transmission torque.

In the embodiments 1 and 4, a fastening bolt whose head is of M5 size (diameter of the head is 8.5 mm) was used, and a C-ring fastening body 7 shown in FIG. 3(a) was used as the fastening body.

In the embodiments 2 and 5, a fastening bolt whose head is of M6 size (diameter of the head is 10 mm) was used, and the other condition was the same as that of the embodiment 1.

In the embodiments 3 and 6, a fastening bolt whose head is of M6 size (diameter of the head is 10 mm) was used, and a pair of semi-circular divided fastening bodies 7a shown in FIG. 5(a) were used. Thus, in the embodiments 3 and 6, two fastening bolts were used.

In the fastening bolts used in the embodiments 1 to 3, the curvature of the tapered curved surface of the lower surface of the head is 7R in the case of the fastening bolt of the embodiment 1 having M5 size, and 8R in the case of the fastening bolt of the embodiments 2 and 3 having M6 size.

On the other hand, in comparative examples 1 to 3, fastening bolts 501 shown in FIG. 8(b) were used as the fastening bolts.

In the comparative example 1, the head size of the fastening bolt is M5 size (diameter of the head is 8.5 mm), and C-ring fastening body shown in FIG. 3(a) was used. This comparative example 1 corresponds to the embodiments 1 and 4.

In the comparative example 2, the head size of the fastening bolt is M6 size (diameter of the head is 10 mm), and C-ring fastening body shown in FIG. 3(a) was used. This comparative example 1 corresponds to the embodiments 2 and 5.

In the comparative example 3, the head size of the fastening bolt is M6 size (diameter of the head is 10 mm), and a pair of semi-circular divided fastening bodies 71 shown in FIG. 5(a) were uses. Thus, two fastening bolts were used in the comparative example 3. This comparative example 3 corresponds to the embodiments 3 and 6.

Materials of the fastening body and the fastening bolt are steel in any of the embodiments 1 to 6 and the comparative examples 1 to 3.

In the embodiments 1, 4 and the comparative example 1, the fastening bolt was fastened with fastening torque of 7.6 N·m. In the embodiments 2, 3, 5, 6 and the comparative examples 2 and 3, the two fastening bolts were fastened with the fastening torque of 13.4 N·m.

Next, the fastening bolt was fastened and then, the shaft was fixed so that it did not rotate, a force in the rotation direction was applied to the fastening body, and a torque value (transmission torque) when the fastening body started rotating was measured. This measurement result is shown in Table 1.

TABLE 1

| | Type of fastening bolt | Type of fastening body | Transmission torque (N · m) |
|---|---|---|---|
| Embodiment 1 | Tapered curved surface | C-ring type | 117.7 |
| Embodiment 2 | Tapered curved surface | C-ring type | 157.0 |
| Embodiment 3 | Tapered curved surface | Semi-circular | 323.7 |
| Embodiment 4 | Tapered | C-ring type | 78.4 |
| Embodiment 5 | Tapered | C-ring type | 147.1 |
| Embodiment 6 | Tapered | Semi-circular | 250.1 |
| Comparative Example 1 | Flat | C-ring type | 58.8 |
| Comparative Example 2 | Flat | C-ring type | 103.0 |
| Comparative Example 3 | Flat | Semi-circular | 171.7 |

From Table 1, in the transmission torque value of the embodiments 1 to 3 the embodiments 4 to 6 are greater by about 50 to 90% of that of the corresponding comparative examples 1 to 3. In the embodiments 1 to 3 having a fastening bolt whose lower surface of the head is the tapered curved surface, the transmission torque value is greater by about 5 to 30% of that of the embodiments 4 to 6 having the fastening bolt whose lower surface of the head is merely tapered.

From the above results, it can be found that according to the fastening bolt of the tapered curved surface used in the embodiments 1 to 3, and the tapered fastening bolt used in the embodiments 4 to 6, the head lower surface allows the shaft to be fastened strongly as compared with the conventional fastening bolt (FIG. 8(b)) having the flat head lower surface, and the transmission torque can be increased.

The invention claimed is:

1. A fastening tool comprising: a fastening body which is provided at its central portion with a shaft hole for the insertion of a shaft, including a slot groove in its axial direction, and having at its one of opposed ends of the slot groove with a bolt through hole formed with a seat surface, and at the other end with a threaded hole, and a fastening bolt which is inserted into the bolt through hole of the one end in the fastening body and is threadedly engaged with the threaded hole of the other end to fasten the fastening body in the circumferential direction, wherein:

the seat surface of the bolt through hole in the fastening body is a conically tapered seat surface formed in a tapered groove, the fastening bolt includes a rod-shaped bolt body provided at its outer periphery with a male thread, and a head which is provided on an end of the bolt body and which has a diameter greater than that of the bolt body and which abuts against the seat surface of the bolt through hole in the fastening body, and a lower surface of the head is formed into a convex arcuately tapered surface whose diameter is reduced toward a tip end of the bolt body, and, wherein the arcuately tapered surface of said fastening bolt is an outwardly curved surface, and the fastening bolt is threadedly inserted into the fastening body whereby the outwardly curved surface of the arcuately tapered surface is in contact with the tapered surface of the fastening body.

2. The fastening tool according to claim 1, wherein the fastening body comprises a pair of divided pieces provided by two slot grooves disposed at locations separated away from each other through 180°, the fastening bolt comprises a pair of bolts for fastening the pair of divided pieces to each other in the circumferential direction.

3. A shaft coupling comprising:

a fastening body having a central portion with a shaft hole for insertion of a shaft, including a slot groove in its axial direction, and which is provided at its one of opposed ends of the slot groove with a bolt through hole formed with a seat surface, and at the other end with a threaded hole; and a fastening bolt which is inserted into the bolt through hole of the one end in the fastening body and is threadedly engaged with the threaded hole of the other end to fasten the fastening body in the circumferential direction; wherein:

a seat surface of the bolt through hole in the fastening body is a conically tapered seat surface formed in a tapered groove;

the fastening bolt including a rod-shaped bolt body provided at its outer periphery with a male thread, and a head which is provided on an end of the bolt body and which has a diameter greater than that of the bolt body and which abuts against the seat surface of the bolt through hole in the fastening body, and the head has a lower surface that is formed into a convex arcuately tapered surface whose diameter is reduced toward a tip end of the bolt body; and two of said fastening bodies connected by an intermediate body are provided, one fastening body being disposed to receive a driving shaft, and the other fastening body being disposed to receive a follower shaft, so that the driving shaft and the follower shaft can be coupled, wherein the arcuately tapered surface of the lower surface of said fastening bolt is an outwardly curved surface, and the fastening bolt is threadedly inserted into the fastening body whereby the outwardly curved surface of the arcuately tapered surface is in contact with the tapered surface of the fastening body.

4. The shaft coupling according to claim 3, wherein the fastening body comprises a pair of divided pieces provided by two slot grooves disposed at locations separated away from each other through 180°, the fastening bolt comprises a pair of bolts for fastening the pair of divided pieces to each other in the circumferential direction.

5. A shaft coupling comprising:

a fastening body including a central portion, a slot groove in its axial direction that has opposed ends, a bolt through hole formed with a conically tapered seat surface in the form of a tapered groove at one end of the slot groove, and a threaded hole at the other end of said slot groove, and a shaft hole located in said central portion for receiving an inserted shaft;

a fastening bolt inserted into the bolt through hole in the one end in the fastening body and threadedly engaged with the threaded hole at the other end of the fastening body to thereby fasten the fastening body in the circumferential direction, said fastening bolt including a rod-shaped bolt body provided at its outer periphery with a male thread, and a head which is provided on an end of the bolt body and which has a diameter greater than that of the bolt body and which abuts against the seat surface of the bolt through hole in the fastening body, wherein the head has a lower surface that is formed into a convex outwardly arcuately tapered surface whose diameter is reduced toward a tip end of the bolt body; and two of said fastening bodies connected by an intermediate body are provided, one fastening body being disposed to receive a driving shaft, and the other fastening body being disposed to receive a follower shaft, so that the driving shaft and the follower shaft can be coupled, and wherein the bolt through hole and the threaded hole in the fastening body are arranged closer to the outer peripheral surface of the fastening body, and the fastening bolt is threadedly inserted into the fastening body whereby the outwardly curved surface of the arcuately tapered surface is in contact with the tapered surface of the fastening body.

6. The fastening tool according to claim 1, wherein a taper angle $\theta_1$ of the tapered curved surface of the fastening bolt is greater than a taper angle $\theta_2$ of the tapered seat surface formed in the tapered groove.

7. The fastening tool according to claim 3, wherein a taper angle $\theta_1$ of the tapered curved surface of the fastening bolt is greater than a taper angle $\theta_2$ of the tapered seat surface formed in the tapered groove.

* * * * *